United States Patent
Kanuri et al.

(10) Patent No.: US 7,079,537 B1
(45) Date of Patent: Jul. 18, 2006

(54) LAYER 3 SWITCHING LOGIC ARCHITECTURE IN AN INTEGRATED NETWORK SWITCH

(75) Inventors: Mrudula Kanuri, Santa Clara, CA (US); Chandan Egbert, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/558,293

(22) Filed: Apr. 25, 2000

(51) Int. Cl.
*H04L 12/28* (2006.01)
*H04L 12/56* (2006.01)
*H04J 3/16* (2006.01)
*H04J 3/22* (2006.01)

(52) U.S. Cl. ...................... 370/392; 370/469
(58) Field of Classification Search ............ 370/389, 370/400, 401, 428, 465, 469, 392
See application file for complete search history.

(56) References Cited

U.S. PATENT DOCUMENTS

| | | | | |
|---|---|---|---|---|
| 5,251,205 A | * | 10/1993 | Callon et al. | 370/392 |
| 5,260,936 A | * | 11/1993 | Bardet et al. | 370/428 |
| 5,353,283 A | * | 10/1994 | Tsuchiya | 370/392 |
| 5,953,335 A | | 9/1999 | Erimli et al. | 370/390 |
| 5,987,524 A | * | 11/1999 | Yoshida et al. | 709/245 |
| 5,991,300 A | * | 11/1999 | Tappan | 370/392 |
| 6,574,240 B1 | * | 6/2003 | Tzeng | 370/469 |
| 6,665,297 B1 | * | 12/2003 | Hariguchi et al. | 370/392 |
| 6,876,654 B1 | * | 4/2005 | Hegde | 370/392 |
| 2001/0012294 A1 | * | 8/2001 | Kadambi et al. | 370/391 |
| 2001/0036161 A1 | * | 11/2001 | Eidenschink et al. | 370/316 |

* cited by examiner

*Primary Examiner*—Chi Pham
*Assistant Examiner*—Kevin C. Harper
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a switching module for performing layer 2 and layer 3 (specifically Internet Protocol) switching operations, and a plurality of network switch ports, each configured for connecting the network switch to a corresponding subnetwork. The switching module includes address tables for storing address information (e.g., layer 2 and layer 3 address and switching information). The network switching module is configured for performing prescribed layer 3 switching that enables transfer of data packets between subnetworks, bypassing a router that normally would need to manage Internet protocol switching between subnetworks of the network. Hence, the network switch performs Internet Protocol switching for intranetwork (i.e., inter-subnetwork) traffic, improving efficiency of the router by enabling the router resources to support more subnetworks.

23 Claims, 8 Drawing Sheets

LAYER 3 SWITCHING LOGIC ARCHITECTURE IN AN INTEGRATED NETWORK SWITCH

BACKGROUND OF THE INVENTION

1. Field of the Invention

The present invention relates to layer 2 and layer 3 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks. A router is distinguishable from an integrated network switch in that the router transfers packets by executing software routines, whereas an integrated network switch is an integrated silicon chip configured for switching data packets based on control data and switching data stored on-chip.

Current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, it becomes increasingly difficult for the switching fabric of a network switch to be able to perform layer 3 processing at the wire rates (i.e., the network data rate). For example, conventional network switches use a centralized switching core having a centralized address lookup table that stores addressing information and frame forwarding decisions for the corresponding address entries, for example 4096 (4k) entries. Layer 3 processing, however, requires implementation of user-defined policies that include searching a large number of fields for specific values. These user-defined policies may specify what type of data traffic may be given priority accesses at prescribed intervals; for example, one user defined policy may limit Internet browsing by employees during work hours, and another user-defined policy may assign a high priority to e-mail messages from corporate executives.

In addition, different layer 3 protocols (e.g., Internet Protocol, IPX, DECnet, etc.) may be encountered by a centralized device such as a router. Hence, layer 3 processing may require the centralized device to identify the layer 3 protocol in use by the received data packet, and then perform the layer 3 processing according to the identified layer 3 protocol.

Hence, the number of such user policies may be very large, posing a substantial burden on performance of layer 3 processing at the wire rates, especially if the centralized switching core needs to rely on accessing a centralized address table for the multiple network switch ports. Hence, implementation of a large number of user policies may require a substantially larger number of address entries, substantially increasing the size of the centralized address lookup table to an unreasonable size that renders implementation in silicon for wire-rate switching unfeasable.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets.

These and other needs are attained by the present invention, where a network switch includes a switching module architecture that enables selective layer 3 switching of data packets at the wire rate (i.e., without blocking of data packets).

One aspect of the present invention provides a method in an integrated network switch having a switching module, the integrated network switch configured for switching a layer 2 data packet. The method includes determining whether the layer 2 packet includes prescribed layer 3 packet information, and selectively performing layer 3 switching based on the determined presence of the prescribed layer 3 packet information, including determining a switching operation based on at least one of a layer 3 source address and a layer 3 destination address. The method also includes selectively performing layer 2 switching based on the determined absence of the prescribed layer 3 packet information. Selectively performing layer 3 switching based on the determined presence of the prescribed layer 3 packet information enables the switching module to perform a prescribed set of layer 3 switching operations; hence, if the layer 2 data packet does not include the prescribed layer 3 packet information (e.g., the layer 3 packet information is outside the scope of the prescribed layer 3 packet information), that layer 2 switching is performed. Hence, the integrated network switch can be configured for selected layer 3 switching operations, enabling the performance of layer 3 switching in an integrated chip.

Another aspect of the present invention provides an integrated network switch having a switching module. The switching module includes an evaluation module configured for evaluating a presence of layer 3 packet information within a received layer 2 packet, the evaluation module configured for identifying selected layer 3 switching functions to be perfomed based on the determined presence of prescribed data within the layer 3 packet information. The switching module also includes an address table configured for storing switching entries, each switching entry configured for storing a layer 2 network address, a layer 3 network address, and corresponding switching information. The switching module also includes an address lookup module and an output module. The address lookup module is configured for searching the switching entries based on at least one of the layer 3 packet information and layer 2 address information in the received layer 2 packet. The output module is configured for generating a switching decision based on the searching of the switching entries by the address lookup module and the evaluation of the presence of layer 3 packet information.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
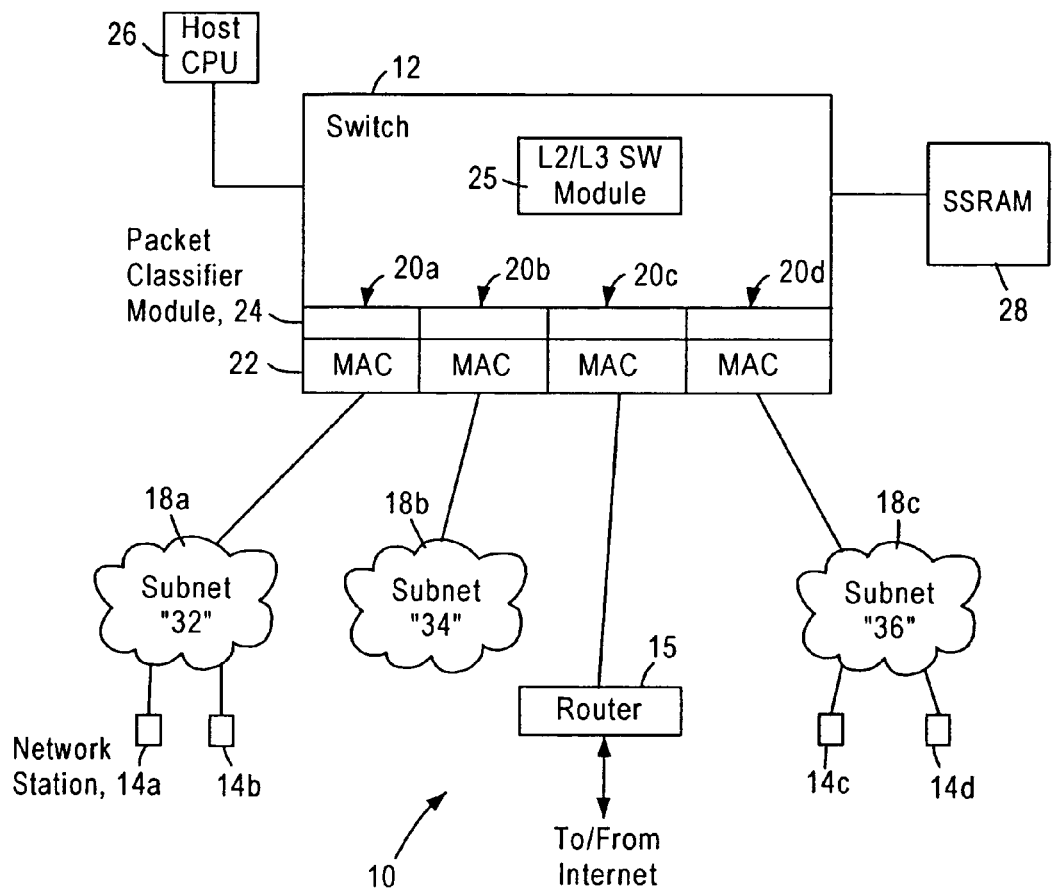
FIG. 1 is a block diagram of a packet switched network having a network switch for switching data packets between subnetworks according to an embodiment of the present invention.

FIG. 1 is a block diagram illustrating a packet switched network 10, such as an Ethernet (IEEE 802.3) network. The packet switched network includes an integrated (i.e., single chip) multiport switch 12 that enables communication of data packets between network stations 14. Each network station 14, for example a client workstation, is typically configured for sending and receiving data packets at 10 Mbps or 100 Mbps according to IEEE 802.3 protocol.

As shown in FIG. 1, the network 10 includes a plurality of subnetworks 18a, 18b, and 18c, each having a corresponding group of network stations 14 and a unique subnetwork identifier (e.g., "32", "34", and "36", respectively). Each network station 14 within a given subnetwork 18 has a host identifier that enables the transmitting network station 14 to be uniquely identified within the corresponding subnetwork 18. Hence, the switch 12 can uniquely identify any transmitting node within the network 10 based on the subnetwork identifier and the host identifier within a received data packet, described in further detail below.

The network 10 also includes a router 15 configured for sending and receiving layer 2 data packets between the network switch 12 and a wide area packet switched network, such as the Internet. Typical layer 3 processing within a packet switched network would involve a network station 14 (e.g., 14a) sending a layer 2 data packet that specifies the router 15 for the destination MAC address, regardless of the layer 3 (e.g., Internet Protocol) destination address; if the router 15 determines that the data packet has an IP destination address that specifies a network station 14 (e.g., 14c) within another one of the subnetworks 18, the router 15 resends the data packet to the network switch 12 with a source MAC address specifying the router 15, a destination MAC address specifying the destination network station 14c, and a destination IP address specifying the destination network station 14c.

As described below, the network switch 12 is configured for performing prescribed layer 3 switching that enables transfer of data packets between subnetworks 18, bypassing the router 15 entirely. Hence, the network switch 12 is configured for layer 3 (preferably Internet Protocol) switching for intranetwork (i.e., inter-subnetwork) traffic, improving efficiency of the router by enabling the router resources to support more subnetworks. For example, if the router 15 has four interfaces, each having a network switch 12 configured for supporting three subnetworks 18, the router 15 can now support twelve subnetworks with no extra load on router resources.

The switch 12 includes switch ports 20, each including a media access control (MAC) module 22 that transmits and receives data packets to the associated network stations 14 across 10/100 Mbps physical layer (PHY) transceivers (not shown) according to IEEE 802.3u protocol. The switch 12 also includes a switching module 25 configured for making frame forwarding decisions for received data packets. In particular, the switching module 25 is configured for layer 2 switching decisions based on source address, destination address, and VLAN information within the Ethernet (IEEE 802.3) header; the switching module 25 is also configured for selective layer 3 switching decisions based on evaluation of IP address information within the Ethernet packet. Each switch port 20 of FIG. 1 includes a packet classifier module 24 configured for performing layer 3 (and above) classification that identifies prescribed layer 2 and layer 3 (and above) information, for example whether the received layer 2 packet includes a valid IP frame within the layer 3 frame (as opposed to IPX, AppleTalk, DECnet, etc.). Hence, the packet classifier module 24 for each network switch port 20 provides front-end distributed processing to determine the presence of a valid IP frame, enabling the switching module 25 to identify a selected layer 3 switching entry to execute the appropriate layer 3 switching decision corresponding to the identified layer 3 switching entry.

As shown in FIG. 1, the switch 12 has an associated host CPU 26 and a buffer memory 28, for example an SSRAM. The host CPU 26 controls the overall operations of the corresponding switch 12, including programming of the switching module 25, described below. The buffer memory 28 is used by the corresponding switch 12 to store data frames while the switching module 25 is processing forwarding decisions for the received data packets.

Figure 2:
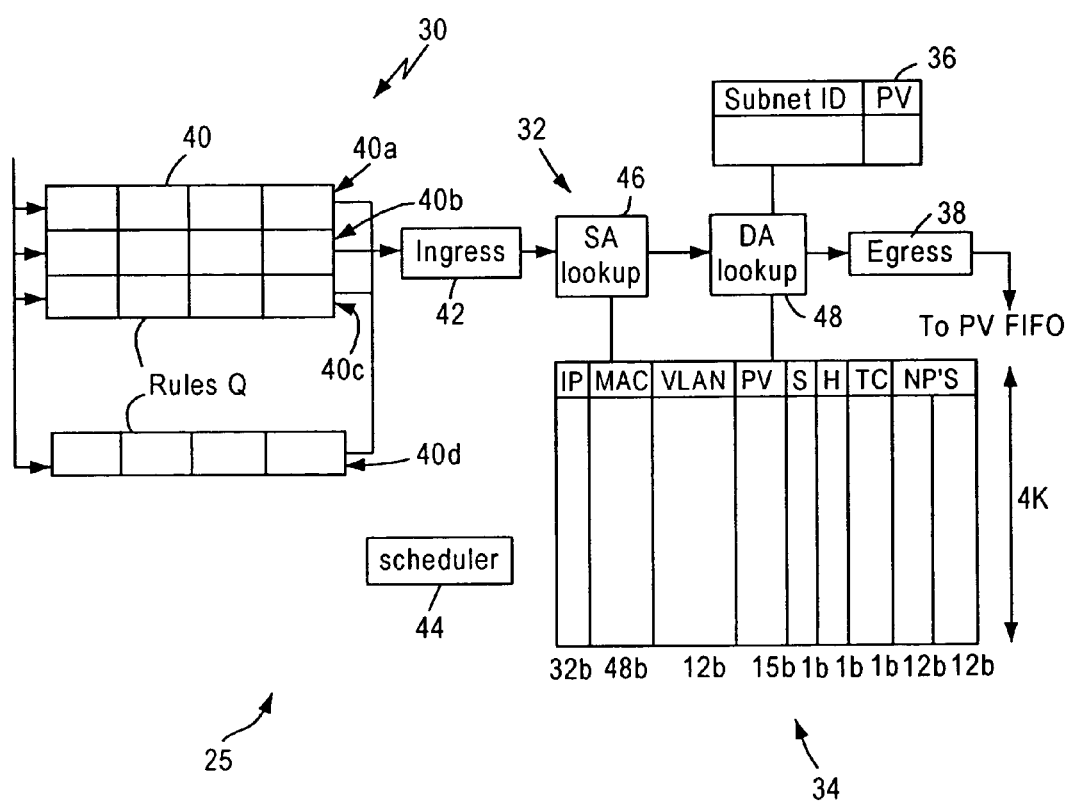
FIG. 2 is a diagram illustrating the switching module of FIG. 1 according to an embodiment of the present invention.

FIG. 2 is a block diagram illustrating the architecture of the switching module 25 according to an embodiment of the present invention. The switching module 25 includes an evaluation module 30, an address lookup module 32, an address table 34, a subnetwork table 36, and an output module 38. The evaluation module 30 includes a rules queue 40, an ingress module 42, and a scheduler 44. The address lookup module 32 includes a source address lookup module 46 and a destination address lookup module 48.

The rules queue 40 is configured for monitoring the transfer of packet data between the network switch ports 20 and the external memory 28, and generating a frame pointer that specifies storage of the received layer 2 data frame and corresponding status information associated with the received data frame, for example if a layer 2 frame is a runt frame. The rules queue 40 performs rule checking on a per-port basis, where the rules queue 40a, 40b, 40c and 40d perform rule checking for network switch ports 20a, 20b, 20c, and 20d, respectively. If necessary, the rules queue 40 may generate flow control and backpressure signals if a network switch port is congested.

The ingress module 42 is configured for determining whether the received layer 2 packet should be supplied to the remaining portions of the switching module 25 or whether the received data packet should be dropped. In particular, the ingress module 42 evaluates each incoming data packet based on a prescribed set of layer 2 and layer 3 rules, and based on parsing for selected layer 2 and layer 3 information within the received data packet. For example, the ingress module parses the received data packet to recover the IP source address, IP destination address, MAC source address, MAC destination address, VLAN identifier, and time to live (TTL) field. The ingress module 42 verifies that the TTL field has a nonzero value, and that the network and subnetwork identifier within the IP source address match prescribed values programmed by the host CPU 26. The ingress module 42 also performs various identification routines (e.g., identifying IGMP frames, BPDUs, GARP frames, MAC control frames, RSVP frames, GGP frames, IGP frames, OSPF frames, EIGRP frames, etc.) based on initial packet classification by the packet classifier modules 24. The ingress module 42 also checks VLAN ingress rules, spanning tree rules, and performs hashing of the MAC and IP source and destination addresses for subsequent searching of the address table 34 by the address lookup module 32. The ingress module 42 also performs priority mapping from VLAN priority to user-based priority, programmed by the host CPU 26, for selected data packets based on prescribed layer 3 (or higher) information; the user-based priority may be used by the egress module 38 to identify whether the data frame should be output according to a high priority.

The ingress module 42, the address lookup module 32 and the egress module 38 operate in a pipelined mode, where the data packets are sequentially processed in a prescribed order controlled by the scheduler 44. The scheduler 44 controls the sequence of packet processing on a per port basis, where each port is assigned at least one time slot within a repeating sequence.

The source address lookup module 46 is configured for searching the address table 34 to determine whether the source MAC or IP address of a received data packet is stored in the address table 34. As described below, the source address lookup module 46 selectively stores the MAC source address and corresponding IP source address if the entry is not already stored in the table 34, and if the source is determined to be a non-router network node within the network 10. The source address lookup module 46 also generates operational codes necessary for the egress module 38, for example if the source node having transmitted the received layer 2 packet is determined to be a priority source having guaranteed latency requirements.

The address table 34 is configured for storing switching entries for respective network nodes, where each switching entry for a corresponding non-router network node is configured for storing a layer 2 MAC address, a layer 3 IP network address, layer 2 VLAN information, and switching information in the form of a port vector (PV). The port vector specifies which network switch ports 20 should output the data packet, plus whether a management port should output the data packet to the host CPU 26 for analysis, and whether an expansion port should output the data packet to another network switch port connected via an expansion interface. The address table 34 also includes an aging field (not shown) that specifies a prescribed aging interval for the corresponding entry, a static bit (S), a hit bit (H), a traffic capture (TC) bit, and next pointer fields (NP) used for hash-based linking of address table entries based on hashed IP addresses and hashed MAC addresses.

The destination address lookup module 48 is configured for obtaining the port vector, containing the switching information for the corresponding entry, from either the address table 34 or the subnetwork table 36, based on whether the address table 34 includes the destination MAC address and/or destination IP address of the received data packet. As described below, the destination address lookup module 48 searches the address table 34 using the hash keys generated for the destination IP address and the destination MAC address, respectively. If no match is found within the destination address 34, the destination address lookup module 48 searches the subnetwork table 36.

Once the division within the IP address field has been performed to establish the lengths of the network identifier field, the subnetwork identifier field, and the host identifier field, the switching logic 25 can be configured by the host CPU 26 with a subnetwork mask that identifies how the fields are divided.

Hence, the destination address lookup module 48 can identify the subnetwork 18 that the data packet should be output to, merely by looking at the subnetwork identifier field within the IP destination address, and by using the appropriate mask.

The egress module 38, also referred to as a forwarding descriptor generator, generates a switching decision based on the searching of the switching entries by the address lookup module 32, and the evaluation of the MAC and IP source and destination addresses. The egress module 38 also checks for VLAN egress rules, spanning tree rules, provides VLAN index to VLAN ID mapping, decrements the TTL field, and recalculates the IP checksum. As described below, the egress module 38 may also insert a new destination MAC address, for example if the router 15 is to be bypassed, and recalculates the MAC cyclic redundancy check (frame check sequence).

Figure 3:
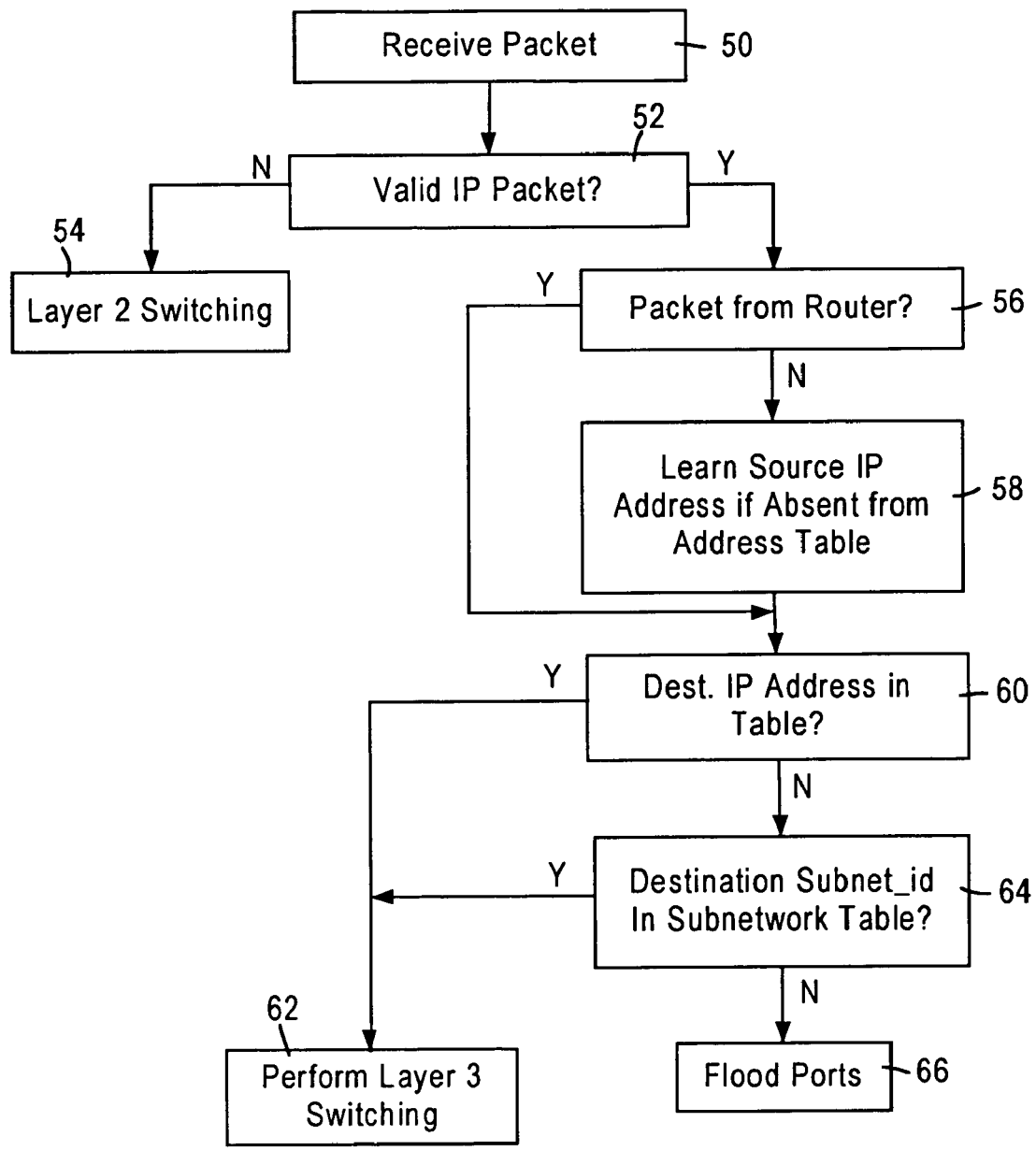
FIG. 3 is a diagram summarizing the method by the switching module of selectively switching data packets according to one of layer 2 switching and layer 3 switching.

FIG. 3 is a diagram summarizing the method by the switching module 25 of selectively performing layer 2 or layer 3 switching of the received data packet according to an embodiment of the present invention. Upon receiving a data packet in step 50, the ingress block 42 checks in step 52 whether the received layer 2 packet includes a valid IP frame. If the ingress port 42 determines that the received data packet does not include a valid IP frame, then the ingress port 42 instructs the address lookup module 32 to perform layer 2 switching in step 54. Note that if the layer 2 address is invalid or the TTL field of a valid IP frame equals zero, the ingress port 42 outputs a null port vector to the switching system, causing the data packet to be dropped.

If in step 52 the ingress module 42 determines that the layer 3 frame is a valid IP frame, the ingress module 42 checks in step 56 whether the received IP frame is from the router 15. If the valid IP frame is received from the router 15, then no learning is to be performed by the source address lookup module 46, since the IP source address may be from an unknown source outside the network 10 that may cause overflowing of the address table 34. Note that the switching module 25 is configured for intranetwork layer 3 switching, hence the IP address of a network node outside the network 10 is of no use to the switching module 25. However if the valid frame is not received from the router 15, then the source address lookup module 46 selectively performs learning of the source IP address in step 58 if the source IP address is absent from the address table 34.

The destination address lookup module 48 then checks in step 60 whether the destination IP address is stored in the table 34. If the destination IP address is stored in the table 34, then layer 3 switching is performed in step 62, enabling the router 15 to be bypassed: if necessary, the destination MAC address (specifying the router) is replaced by the egress module 38 with the destination MAC address of the network node 14 identified by the destination IP address. If the destination IP address is not stored in the table 34, the destination address lookup module 48 checks in step 64 to determine whether the IP destination address includes a subnetwork identifier stored within the subnetwork table 36; if the subnetwork identifier is located within the table 36, the corresponding port vector is used for layer 3 switching in step 62, else all the network switch ports are flooded in step 66.

Figure 4A:
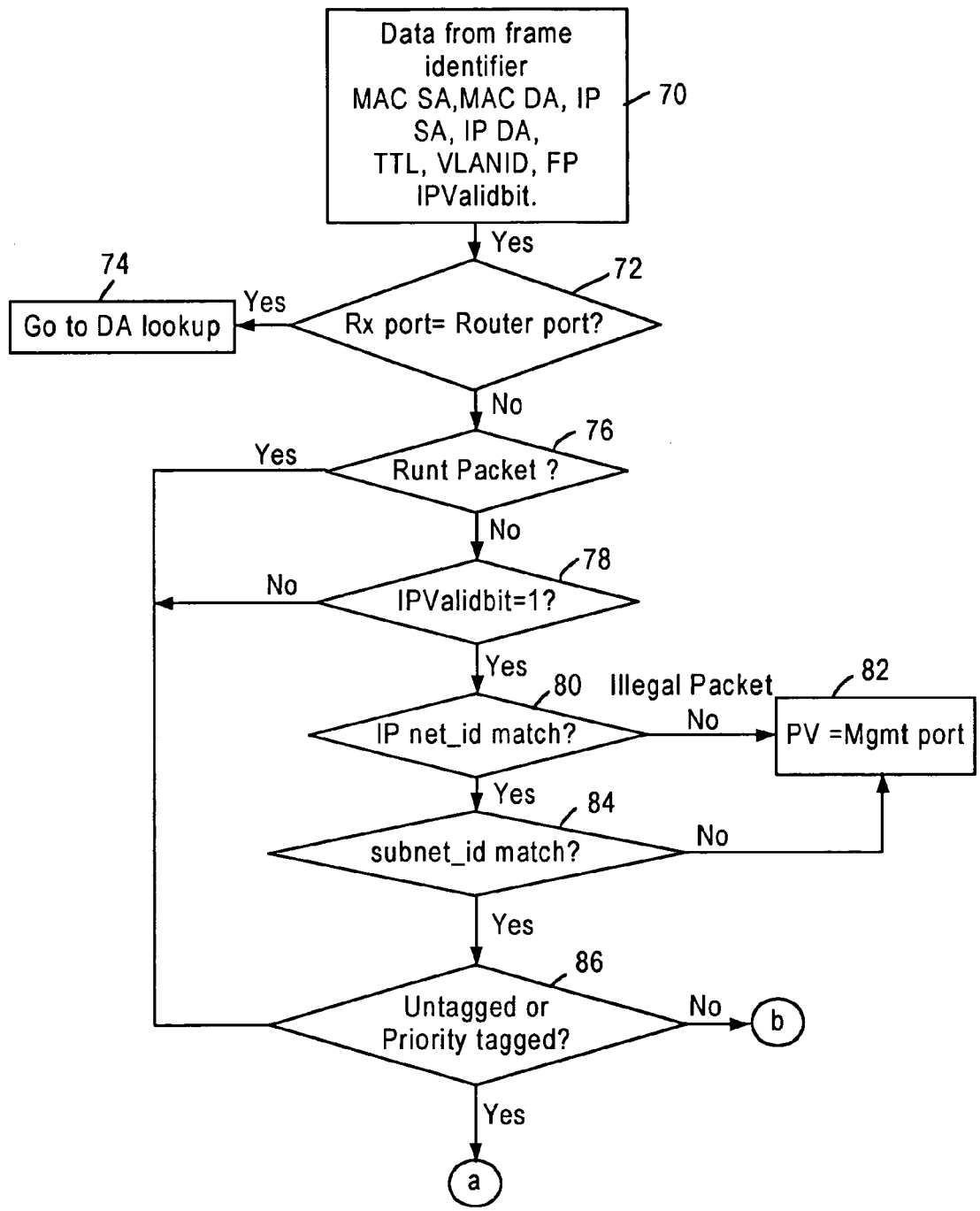
FIGS. 4A, 4B and 4C are flow diagrams summarizing in detail the source address lookup operation of FIG. 3.
Figure 4B:
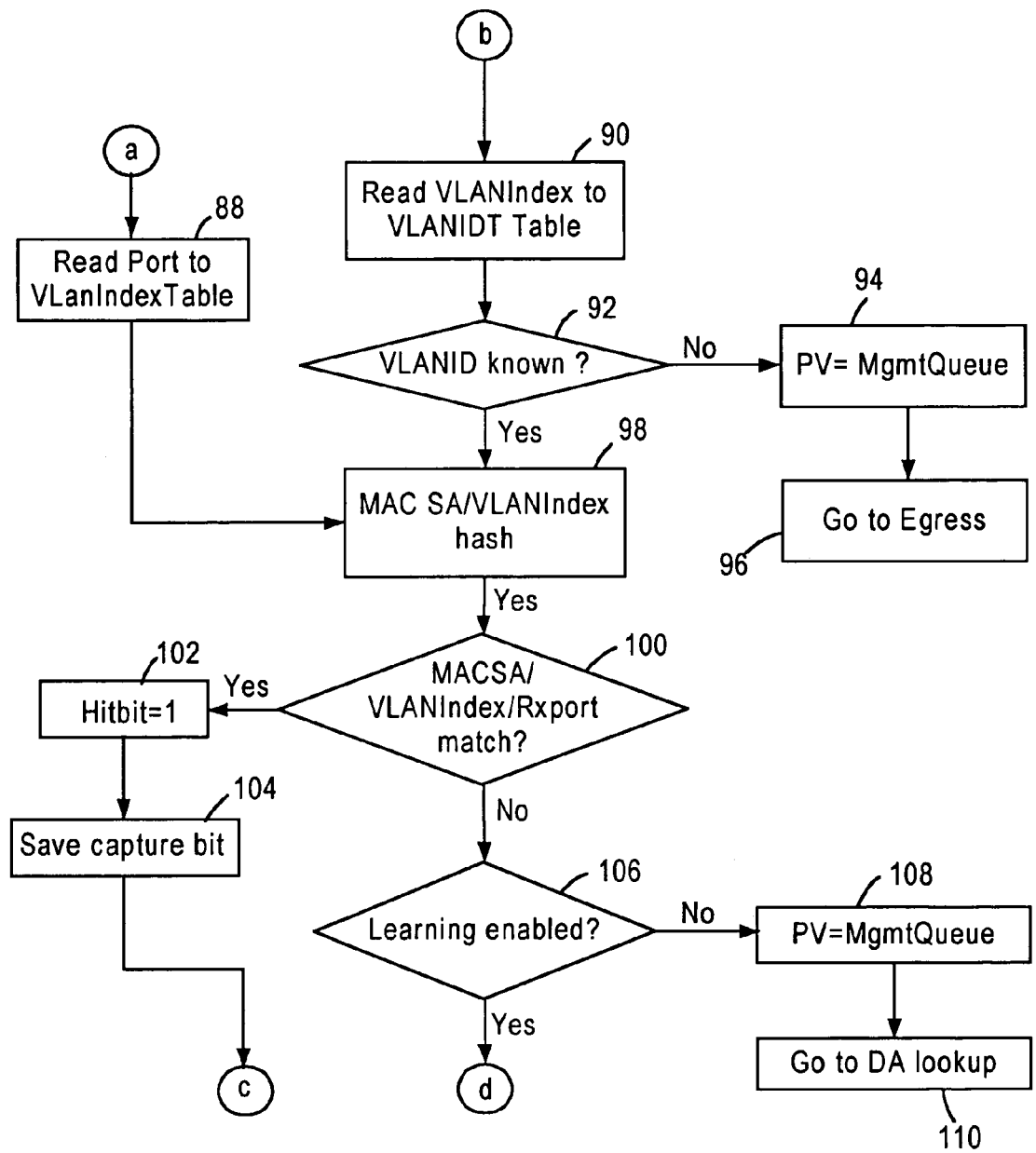
Figure 4C:
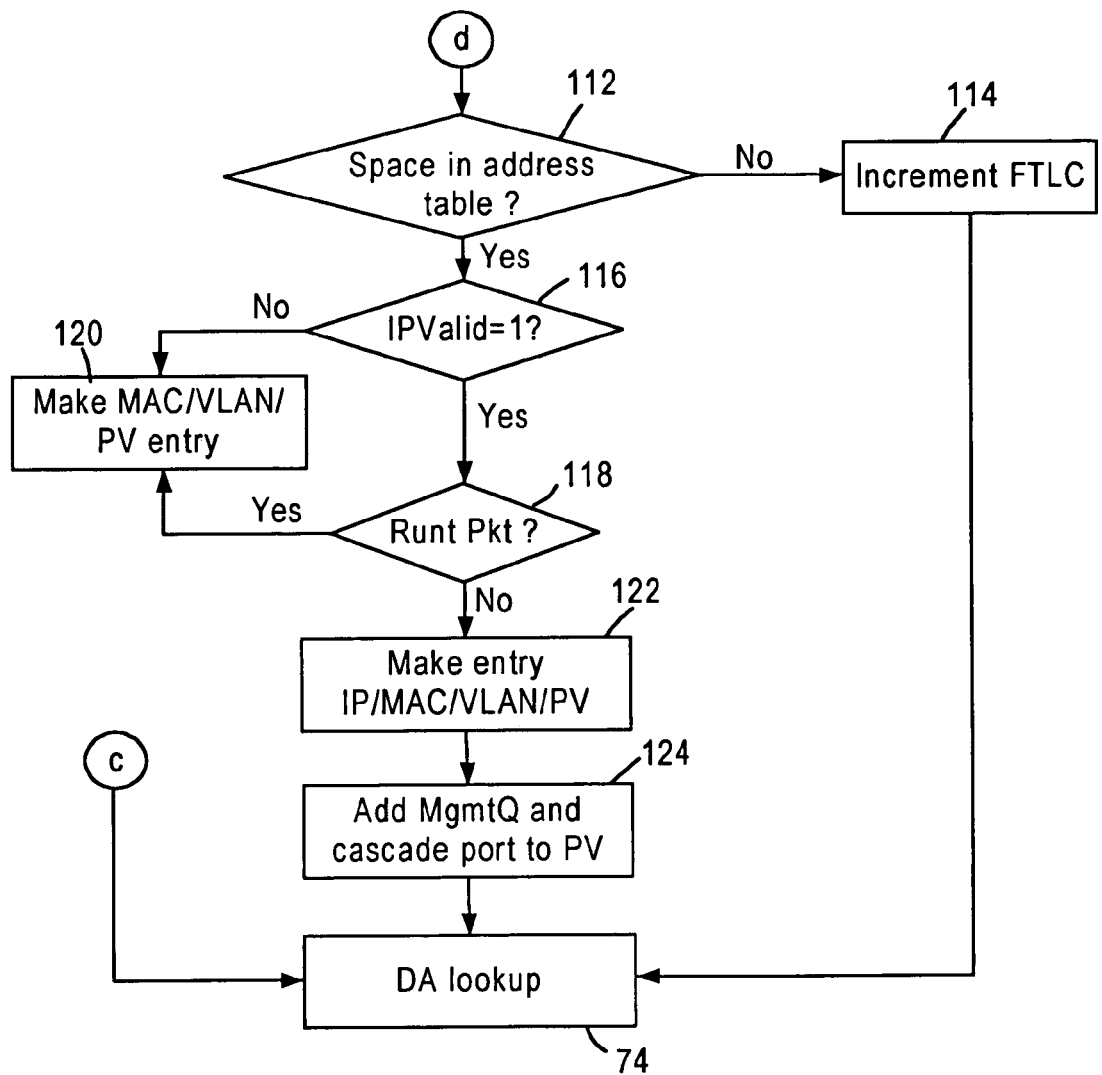

FIGS. 4A, 4B and 4C are diagrams summarizing in detail the source address lookup and learning procedure of step 58. The ingress module 42 parses the received data frame in step 70 and checks the MAC source address, MAC destination address, IP source address, IP destination address, TTL field, VLAN ID, and IP valid bit to confirm that the layer 2 packet includes a valid IP frame. If in step 70 to the ingress port determines the receive port is the router port 20c, the source address lookup module 46 is bypassed in step 74 for destination address lookup.

The ingress module 42 checks for a runt packet in step 76, an IP valid bit in step 78, and checks in steps 80 and 84 whether the IP source address specifies a valid IP network identifier and valid IP subnetwork identifier, respectively. If the IP network identifier or the IP subnetwork identifier within the IP source address does not match, the packet is an illegal packet and is forwarded to the management port in step 82 for analysis by the host CPU.

The ingress module 42 then checks whether the received data frame is untagged or priority tagged in step 86. If the frame is untagged or priority tagged, then the source address lookup module 46 reads a prescribed port to VLAN index table in step 88 for priority information. If the data frame is tagged and does not have a priority tag, the source address lookup module 46 reads a VLAN index to VLAN ID table in step 90 to identify the VLAN ID. If the VLAN identifier is unknown in step 92, the host CPU is notified in steps 94 and 96.

The ingress module then performs a MAC source address/VLAN index hashing operation in step 98, and forwards the hash key to the source address lookup module 46. If in step 100 the source address lookup module 46 detects a match, the hit bit (H) in the address entry is set in step 102 and the traffic capture bit is saved in step 104 to reset any aging function for the address entry. If no match is detected in step 100 and learning is disabled in step 106, the host CPU is notified in steps 108 and 110.

If learning is enabled, the source address lookup module 46 checks whether there is available space in the address table 34 in step 112 of FIG. 4C. If no space is available, an FTLC counter is incremented in step 114. The source address lookup module 46 then checks whether the IP valid bit is set in step 116 and whether the data packet is a runt packet in step 118, and selectively stores either a layer 2 address entry in step 120 or a layer 3 address entry having an IP address, MAC address, VLAN field, and port vector in step 122. The host CPU is notified in step 124, and destination address lookup operations begin in step 74.

Figure 5A:
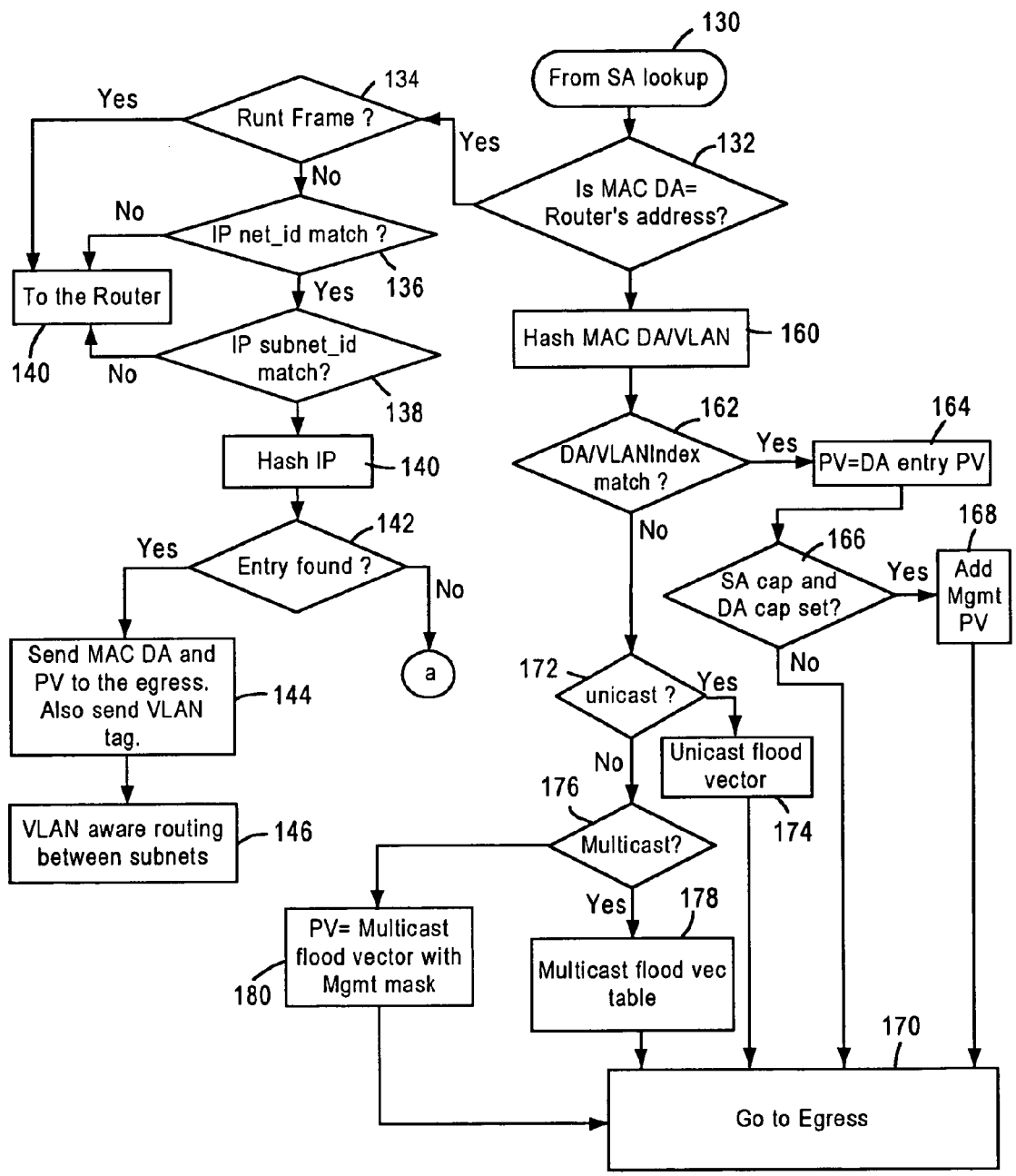
FIGS. 5A and 5B are flow diagrams summarizing in detail the destination address lookup operation of FIG. 3.
Figure 5B:
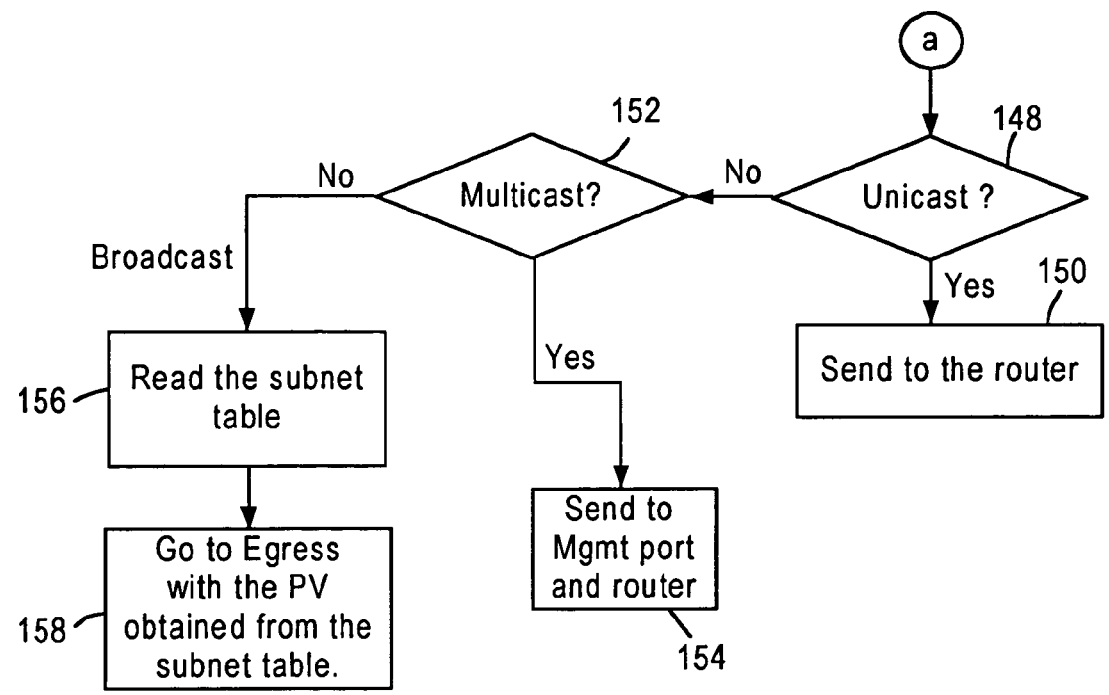

FIGS. 5A and 5B summarize the method of performing layer 2/layer 3 destination address lookup by the destination address lookup module 48. The destination address lookup module 48 begins operations following the above-described SA lookup operations in step 130. If in step 132 the destination address lookup module 48 determines that the layer 2 packet has a destination MAC address that specifies the MAC address of the router 15, the destination address lookup module 48 begins operations to determine whether the router 15 can be bypassed. In particular, if the frame is determined in step 134 to be a runt frame (with no IP frame), if there is no valid IP network identifier match in step 136, or if there is no valid IP subnetwork identifier match in step 138, the packet is sent to the router in step 140. Otherwise, if the received layer 2 packet includes a valid IP frame, the IP destination address is hashed in step 140 and the address table 34 is searched using the hash key generated from the IP destination address.

If in step 142 a match is found for the destination IP address, indicating that the router 15 can be bypassed, the destination address lookup module 48 sends the MAC address for the network node corresponding to the match destination IP address as specified in the address table 34, along with the corresponding port vector field and VLAN tag to the egress module 38 for layer 3 switching in step 144. The egress module 38 then performs VLAN aware routing between the subnetworks 18 in step 146.

Hence, the switching module 25 is able to intercept a data packet destined for the router 15 by identifying the data packet as intranetwork traffic based on the IP destination address specifying a valid network ID, subnetwork ID, and host ID. Consequently, the integrated network switch 12 can perform layer 3 switching operations for data packets between subnetworks 18, relieving the router 15 of intranetwork traffic and enabling the router to be more effectively utilized for internetwork traffic between the network 10 and external networks, such as the Internet.

If in step 142 the IP addresses not located, indicating an unknown host ID, then as shown in FIG. 5B the layer 3 frame is sent to the router 15 in step 150 if in step 148 the frame is determined to be a unicast frame. The router 15 can then send an address resolution protocol (ARP) message, enabling the network switch 12 to learn the unknown IP address upon detecting a reply to the ARP. If the frame is determined in step 152 to be a multicast frame, the frame is sent to the host CPU 26 and the router 15 in step 154 in case there may exist multicast members outside of the intranet (i.e., the network 10).

If the frame is determined in step 152 to be a broadcast frame, the destination address lookup module 48 reads the subnetwork table 36 in step 156, and forwards to the egress module 38 the port vector obtained from the subnetwork table 36 in step 158. Hence, the IP frame can still be broadcast to the appropriate destination subnetwork 18, even though the host identifier within the destination IP address is unknown.

According to the disclosed embodiment, selected Internet protocol switching is performed by the switching fabric 25 for data traffic within the network 10, i.e., between subnetworks 18, enabling the router 15 to avoid the necessity of managing intranetwork IP traffic. Hence, the router 15 only needs to receive from the network switch 12 data packets that are destined outside the network 10, or data packets that have a layer 3 protocol other than Internet protocol.

Note that once the network switch 12 has intercepted intranetwork traffic originally destined for the router, the network stations 14 may recognize each other's MAC and IP addresses, enabling data packets to be transferred between subnetwork 18 at the layer 2 level. Hence, layer 3 processing by the network switch module 25 may be reduced over time, requiring only switching according to prescribed protocols to guarantee quality of service.

Referring to FIG. 5A, if in step 132 the MAC destination address does not specify the router, then the MAC destination address and VLAN fields are hashed in step 160 and used for searching the MAC and VLAN field of the address table 34. If in step 162 a match is detected, the corresponding port vector is retrieved in step 164 and 42 the egress module 38 in step 170 after checking in step 166 whether the host CPU 26 should be notified in step 168.

If in step 162 no match is detected and the frame is determined in step 172 to be a layer 2 unicast frame, the destination address lookup module 48 outputs a layer 2 unicast flood vector in step 174. However if in step 176 the frame is determined to be a layer 2 multicast frame, then the destination address lookup module 48 outputs a multicast flood vector in step 178, else generates a multicast flood vector with a management mask to notify the host CPU 26 in step 180.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated network switch having a switching module, the integrated network switch configured for switching a layer 2 packet, the method comprising:
   determining whether the layer 2 packet includes prescribed layer 3 packet information;
   selectively performing layer 3 switching based on the determined presence of the prescribed layer 3 packet information, including determining a switching operation based on at least one of a layer 3 source address and a layer 3 destination address, including:
   (1) determining a presence of a subnetwork identifier within the prescribed layer 3 packet information,
   (2) searching a first table, configured for storing switching entries for respective Internet Protocol (IP) addresses, for a corresponding switching entry storing the layer 3 destination address, and
   (3) selectively searching a second table, configured for storing switching entries for respective prescribed subnetwork identifiers, for a corresponding switching entry storing the subnetwork identifier, the selectively searching being performed based on a determined absence of the corresponding switching entry storing the layer 3 destination address; and
   selectively performing layer 2 switching based on the determined absence of the prescribed layer 3 packet information.

2. The method of claim 1, wherein the determining step includes first detecting a presence of an Internet Protocol (IP) header within the layer 2 packet as the prescribed layer 3 packet information.

3. The method of claim 2, wherein the step of selectively performing layer 3 switching includes second detecting whether the IP header specifies a prescribed network identifier and the subnetwork identifier.

4. The method of claim 3, wherein the second detecting step includes comparing a source IP address within the IP header with the second table.

5. The method of claim 4, wherein the step of selectively performing layer 3 switching further includes obtaining layer 3 switching information from the second table based on a match between the subnetwork identifier within the IP header and a corresponding one of the prescribed subnetwork identifiers.

6. The method of claim 4, wherein the step of selectively performing layer 3 switching further includes dropping the layer 2 packet based on a determined absence of any one of the prescribed subnetwork identifiers within the source IP address.

7. The method of claim 2, wherein the step of selectively performing layer 2 switching includes accessing a layer 2 switching table, based on layer 2 packet information, in response to the determining step determining that the layer 2 packet includes one of an IPX frame and a DECnet frame.

8. The method of claim 1, wherein the step of selectively performing layer 3 switching includes dropping the layer 2 packet in response to determining that the layer 2 packet includes a time to live (TTL) field having a value equal to zero.

9. The method of claim 8, wherein the step of selectively performing layer 3 switching includes:
   obtaining layer 3 switching information based on the determined presence of the prescribed layer 3 packet information and based on determining that the TTL field has a value greater than zero; and
   decrementing the TTL field prior to outputting the layer 2 packet based on the obtained layer 3 switching information.

10. The method of claim 9, wherein the step of selectively performing layer 3 switching further includes:
    second determining whether the layer 2 packet includes a destination MAC address specifying a router and a destination IP address specifying a network node within a prescribed subnetwork; and
    selectively replacing the destination MAC address specifying the router with a second MAC address specifying the network node, based on the second determining step.

11. The method of claim 10, wherein the step of selectively performing layer 3 switching further includes recalculating an IP checksum and MAC cyclic redundancy check based on the selective replacement of the destination MAC address with a second MAC address.

12. The method of claim 1, wherein the integrated network switch is implemented on a single integrated chip that perfoms each of the steps of determining, selectively performing layer 3 switching, and selectively performing layer 2 switching.

13. An integrated network switch having a switching module comprising:
    an evaluation module configured for evaluating a presence of layer 3 packet information within a received layer 2 packet, the evaluation module configured for identifying selected layer 3 switching functions to be perfomed based on the determined presence of prescribed data within the layer 3 packet information;
    an address table configured for storing switching entries, each switching entry configured for storing a layer 2 network address, a layer 3 network address, and corresponding switching information;
    a subnetwork table configured for storing switching entries for respective prescribed subnetwork identifiers;
    an address lookup module configured for searching the switching entries based on at least one of the layer 3 packet information and layer 2 address information in the received layer 2 packet, the address lookup module configured for selectively determining a presence of a subnetwork identifier within the layer 3 packet information, and searching the subnetwork table for a corresponding switching entry storing the subnetwork identifier, based on a determined absence of the corresponding switching entry storing the layer 3 network address in the address table; and an output module configured for generating a switching decision based on the searching of the switching entries by the address lookup module and the evaluation of the presence of layer 3 packet information.

14. The switch of claim 13, wherein the evaluation module includes:

a rules queue configured for generating status information for the received layer 2 packet; and an ingress module configured for parsing the received layer 2 packet for layer 2 address information and layer 3 address information and determining whether the received layer 2 packet should be dropped based on the layer 2 address information, the evaluation of the presence of layer 3 packet information, and the status information.

15. The switch of claim 14, wherein the ingress module is configured for identifying within the received layer 2 packet a media access control (MAC) source address, a MAC destination address, an Internet Protocol (IP) source address, an IP destination address, and a nonzero time to live (TTL) field.

16. The switch of claim 15, wherein the ingress module is configured for dropping the layer 2 packet in response to detecting the TTL field having a zero value.

17. The switch of claim 15, wherein the address lookup module includes a source address lookup module configured for selectively storing the MAC source address and corresponding IP source address of a determined non-router network node having transmitted the received layer 2 packet.

18. The switch of claim 17, the address lookup module further including a destination address module configured for obtaining the switching information from a selected switching entry of one of address table and the subnetwork table based on at least one of the IP destination address and the MAC destination address.

19. The switch of claim 13, wherein the output module assigns the switching decision a prescribed priority based on the identified selected layer 3 switching functions to be performed based on the determined presence of the prescribed data within the layer 3 packet information.

20. The switch of claim 19, wherein the output module decrements a detected nonzero time to live (TTL) field within the layer 3 packet information.

21. The switch of claim 19, wherein the output module replaces a destination MAC address in the received layer 2 packet, determined as corresponding to a layer 2 router address, with a second MAC address based on a detected destination IP address in the layer 3 packet information specifying a second network node identified in one of the switching entries.

22. The switch of claim 13, wherein the integrated network switch is implemented on a single integrated chip.

23. The switch of claim 13, wherein the address lookup module is configured for searching the switching entries based on the layer 2 address information in the received layer 2 packet, in response to a determination within the integrated network switch that the layer 2 packet includes one of an IPX frame and a DECnet frame.

* * * * *